United States Patent Office 2,816,421
Patented Dec. 17, 1957

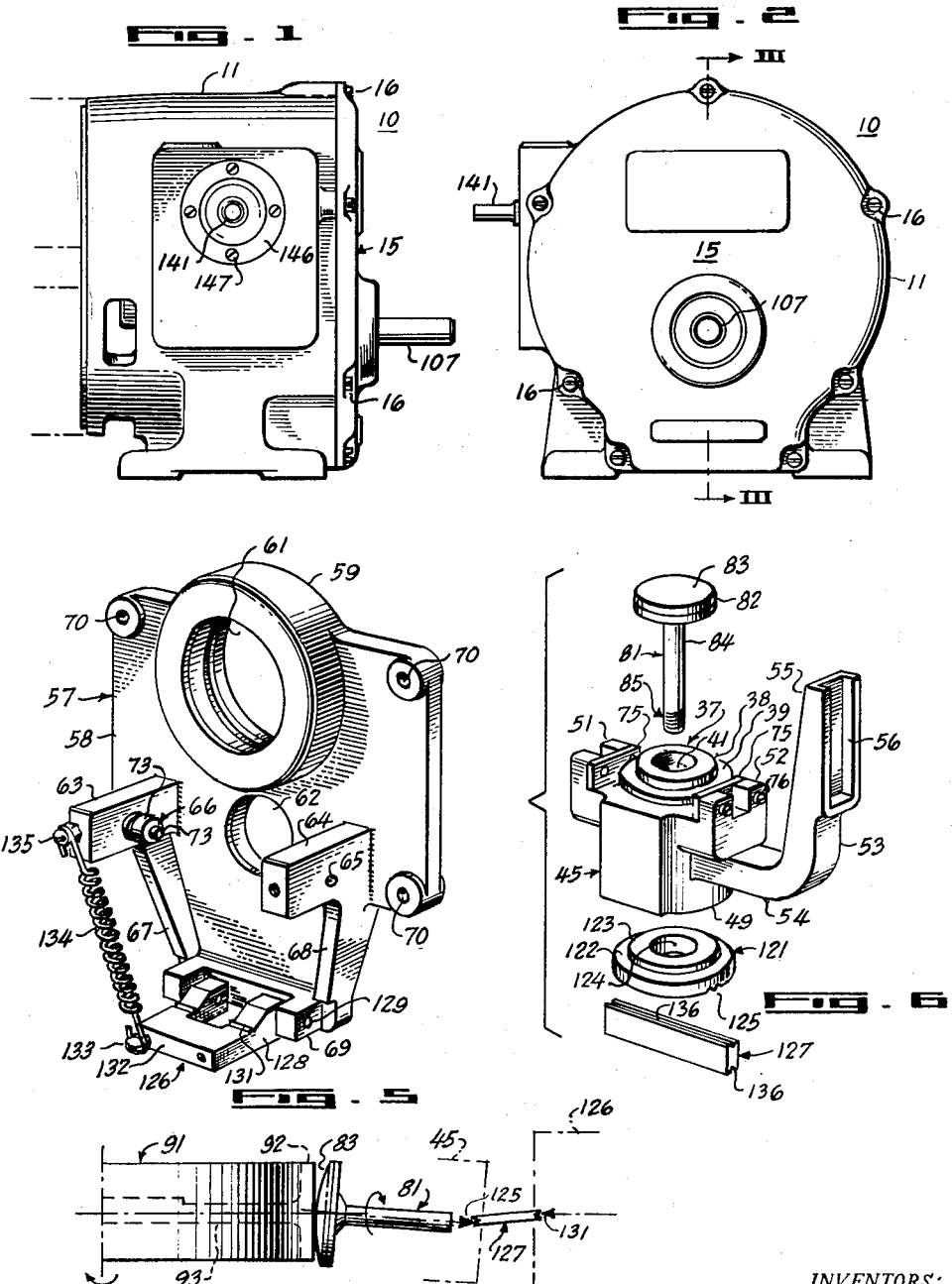

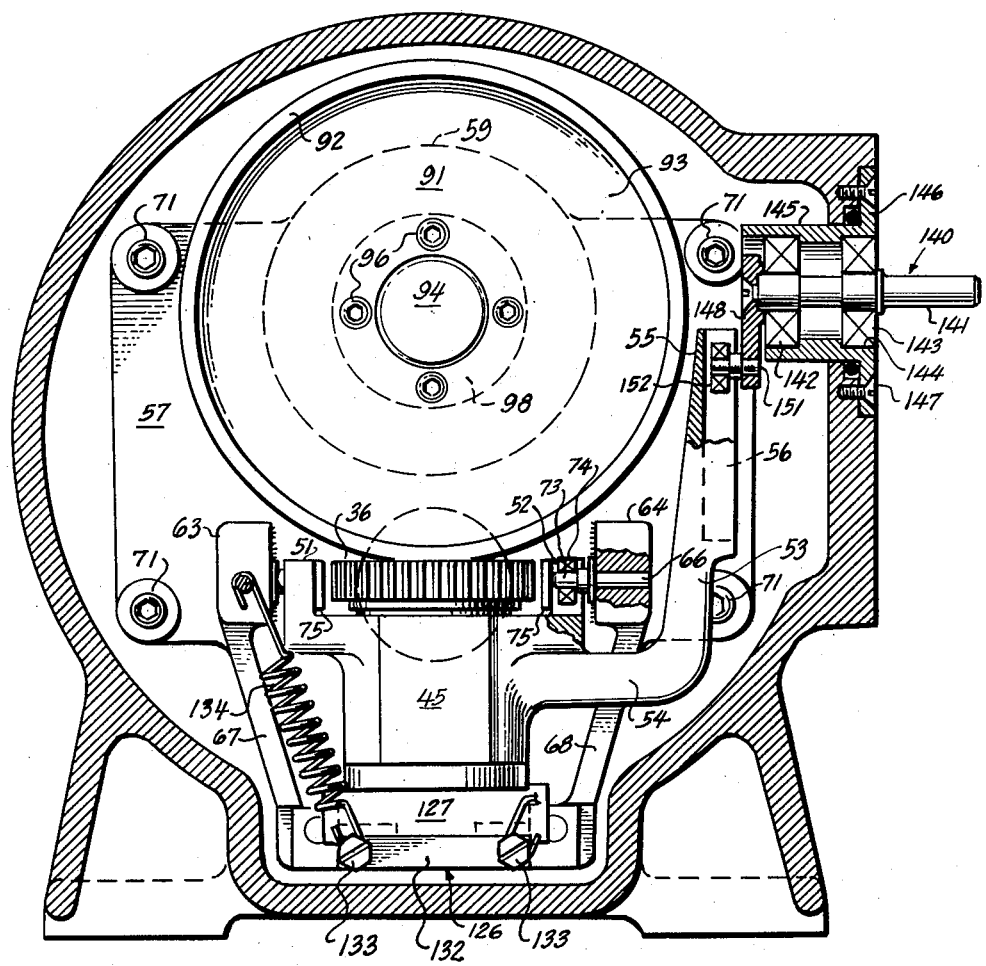

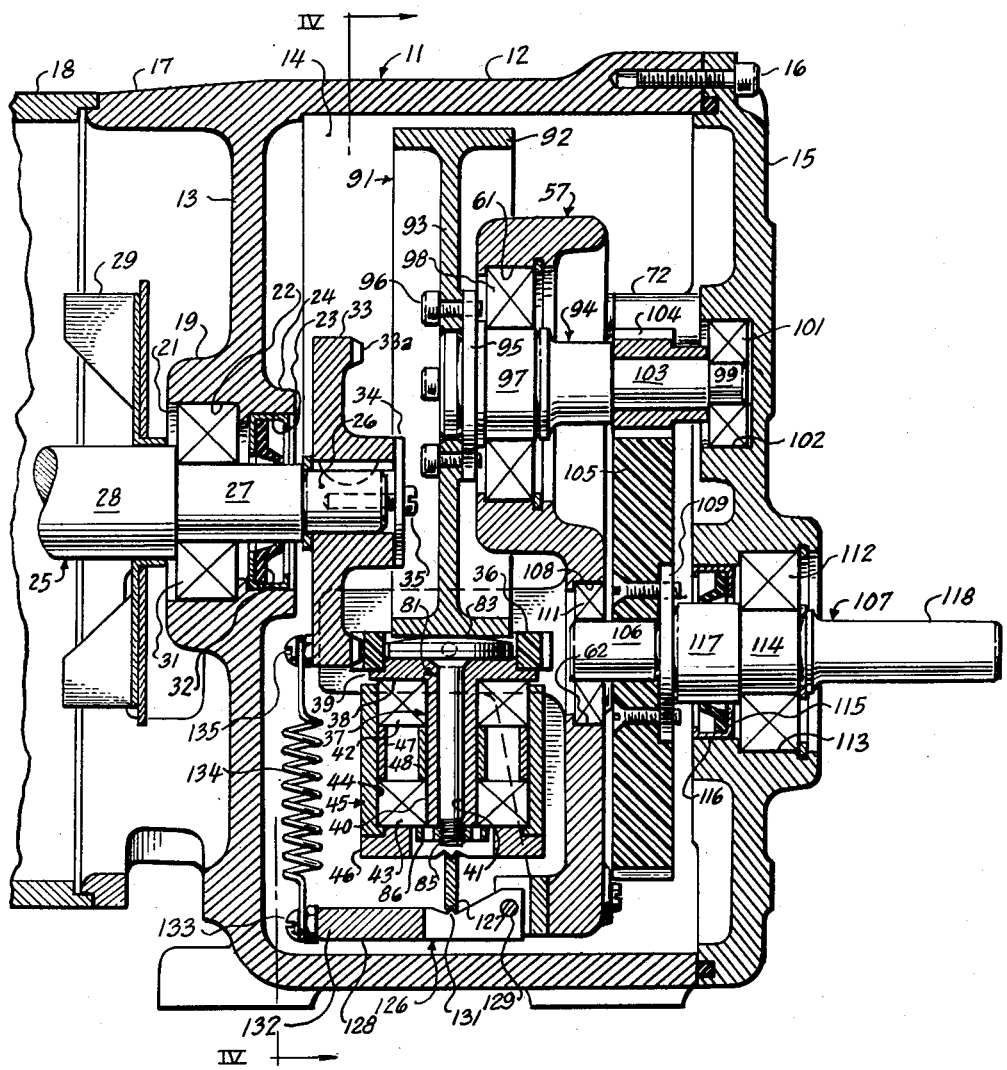

2,816,421

VARIABLE SPEED TRANSMISSION

Paul E. Humphrey and Richard S. Kampf, Lemon Grove, Calif., assignors to Humphrey, Inc., San Diego, Calif., a corporation of California Application June 21, 1954, Serial No. 438,220

6 Claims. (Cl. 74—198)

This invention relates generally to variable speed transmission devices and more particularly to mechanical variable speed transmission devices of the frictional drive type.

An object of the present invention is to provide a novel variable speed transmission drive embodying improved means for providing motion frictionally from a primary shaft to a secondary shaft.

Another object of this invention is to provide a variable speed transmission device having an improved arrangement of parts for obtaining an adjustable or variable-shaft speed from a constant speed source.

Another object of this invention resides in providing a unique variable speed reversible transmission drive wherein power is efficiently and effectively transmitted from a drive motor to a driven shaft without variable gearing or the use of cumbersome mechanism.

Another object of this invention is to provide in a variable speed transmission device a construction which affords a zero position wherein the drive is irreversible thereby to eliminate a need for braking means.

Another object of this invention resides in providing a novel form of variable speed transmission device, driven by a continuously running motor, which is adapted to change from a high speed to a low or zero speed quickly, smoothly and efficiently.

Another object of this invention is to provide an improved variable speed transmission device having a novel construction whereby only small control forces are required to produce variations in speed and in direction of output.

A further object of this invention is to provide an improved variable speed reversible transmission device which is of simple and durable construction, economical to manufacture, and accurate and effective in operation.

Other objects and features will be readily apparent to those skilled in the art from the following description when taken in connection with the accompanying drawings, in which:

Figure 1 is a side elevational view of a variable speed transmission device embodying the present invention.

Figure 2 is a front elevational view of the same device.

Figure 3 is an enlarged sectional view along the line III—III of Figure 2.

Figure 4 is a sectional view along the line IV—IV of Figure 3 with certain parts omitted for clarity.

Figure 5 is a perspective view illustrating details of a supporting assembly used in the present device.

Figure 6 is an exploded perspective view illustrating certain elements of the present speed control assembly; and Figure 7 is a generally schematic view illustrating the drive principle of the present invention.

Referring now in greater detail to the drawings, the variable speed transmission device is illustrated as a unit generally by the numeral 10. Transmission device 10 embodies a suitable housing or frame 11 of generally cylindrical shape having side walls 12 and a rear wall 13 integral therewith, which walls cooperate to define a chamber 14. A cover 15 serves to close the front opening into chamber 14 of housing 11, being suitably secured to the outer edges of side walls 12 as by bolts 16. Housing 11 also includes a rearwardly extending flange 17 which is adapted to interfit with the end of a motor casing 18.

Rear wall 13 is provided on its exterior surface with a generally centrally located boss 19 having a recess 21 therein, which recess 21 communicates through a bore 22 with a recess 23 formed in an integral central boss 24 on the interior face of rear wall 13. Recess 21, bore 22 and recess 23 are axially aligned and serve to rotatably accommodate and permit the passage of a motor armature shaft 25. Shaft 25 constitutes the driving member through which power is provided the present device. The motor of which shaft 25 forms a part is not shown since the details of construction of the motor forms no part of the present invention. It is understood, therefore, that the present invention contemplates the use of conventional motors which are adapted to serve as a constant-speed source for operation of the present speed transmission device.

Drive shaft 25 is formed with an end portion 26, an intermediate shaft portion 27, and a main shaft portion 28, with intermediate shaft portion 27 being of lesser diameter than main shaft portion 28 and end portion 26 having a smaller diameter than intermediate shaft portion 27.

Main shaft portion 28 carries a usual fan element 29 which is suitably fixedly attached thereto adjacent boss 19 and which serves to provide cooling air for the motor.

As shown, intermediate shaft portion 27 projects through recess 21, bore 22 and recess 23 and is journaled within bearings 31 positioned in recess 21 and passes through an appropriate seal assembly 32 afforded in recess 23. End shaft portion 26 lies within chamber 14 and, in the present embodiment of the invention, is fitted with a usual face gear 33 having teeth 33a formed on its lateral face, as shown. Gear 33 is suitably keyed to the shaft to effect common rotation therewith. A retainer washer 34 and a mounting screw 35 adapted to be threaded into a tapped recess in the end of the shaft serve to maintain gear 33 upon end shaft portion 26.

Gear 33 meshes with a spur pinion gear 36 which is suitably affixed, as by a drive fit, upon a disc holder member 37. The conformation and placement of the teeth of gears 33 and 36 relative to one another is such that disc holder member 37 will be permitted to pivot or rotate, as will be further described, to move gear 36 bodily relative to gear 33 without the teeth of these gears becoming disengaged. It is understood that this invention is not limited to the combination of the particular gears 33 and 36 shown but that other combinations are contemplated, for instance, a straight spur drive gear could be employed with a straight spur driven gear, with proper spacing of teeth made to permit bodily pivotal movement or shifting of the latter gear without disengagement of the teeth. Disc holder member 37, as shown, comprises an annular head portion 38, which projects into gear 36, having an outwardly extending peripheral flange 39 which provides a seat upon which gear 36 rests. A cylindrical shaft portion 40 projects downwardly centrally from the bottom face of head portion 38, and has an axial opening 41 therethrough which opening 41 also extends through head portion 38. Shaft portion 40 is journaled for rotative movement within a pair of spaced bearings 42 and 43. The bearings 42 and 43 are operatively supported within a recess 44 provided by a disc support bracket 45, lower bearing 43 resting upon an inwardly projecting annular shoulder 46 of bracket 45 and having a pair of concentrically positioned ring-shaped spacers 47 and 48 positioned thereon for support of upper bearing 42 in properly spaced relationship to lower bearing 43.

Disc support bracket 45, as best shown in Figure 6, includes a generally cylindrical body portion 49 which is provided with the recess 44 (shown in Figure 3) which contains bearings 42 and 43. Projecting from opposite sides of body portion 49 are integral bifurcated portions 51 and 52. Integral also with body portion 49 is a generally L-shaped portion 53 having a horizontal leg 54 which merges into body portion 49 and a vertical leg 55 which is provided with a generally rectangular shaped guide slot 56 for a purpose to be described.

Disc support bracket 45 which has just been described is pivotally positioned upon a main support member 57 the shape of which is best shown in Figure 5. As there illustrated, main support member 57 comprises a generally plate-like body portion 58 having a boss 59 formed thereon adjacent its top edge and generally centrally between its lateral edges, which boss 59 has an opening 61 therethrough. Below boss 59 there is located in body portion 58 another through opening 62. At opposite sides of opening 62 there are provided a pair of outwardly projecting arm portions 63 and 64 each of which has a transverse opening 65 therethrough. Into each of the openings 65 there is fitted a pivot pin 66. Downwardly extending from arm portions 63 and 64 and inclined inwardly are flanges 67 and 68. Suitably mounted, as by screws, to support member 57 between the flange 67 and 68 and adjacent their lower ends is a generally U-shaped support element 69 whose purpose will later be described. Appropriately placed about body portion 58 of support member 57 are a plurality of mounting holes 70 through which suitable mounting screws 71 (shown in Figure 4) pass and are threaded into tapped holes afforded in inwardly projecting bosses 72 (Figure 3) provided on cover 15. Thus, main support member 57 is mounted to and is removable with cover 15.

As hereinbefore stated, disc support bracket 45 is pivotally mounted to main support member 57. This pivotal mounting, as best shown in Figure 4, is obtained through means of the pivot pins 66 carried by projecting arm portions 63 and 64 of main support member 57. It is noted that the pivot pins 66 are each provided with an external portion 73. These portions 73 are journaled within bearings 74 which are suitably carried by bifurcated portions 51 and 52 of disc support bracket 45. Retainer plates 75 (Figures 4 and 6) span the openings in bifurcated portions 51 and 52, being suitably secured to such portions by mounting screws 76, to maintain the pivot pins 66 in desired operative positions. It is understood, of course, that the position of the pivoting elements could be reversed, with the pivot pins 66 mounted on the disc support bracket 45 and the bearings 74 suitably carried on arm portions 63 and 64.

Disc holder member 37 which is rotatively supported by disc support bracket 45 provides a support for a disc member 81 which latter member is best illustrated in Figures 3 and 6. Disc member 81 comprises a disc head 82 having an upper face portion 83 of spherical curvature. Depending centrally from the bottom of disc head 82 is a shaft 84 whose lower end is threaded as at 85. Shaft 84 is fitted within axial opening 41 of disc holder member 37 and projects its threaded end 85 beyond the lower end of member 37 to accept a lock nut 86 which is tightened against the lower end of member 37 whereby disc member 81 is rigidly affixed to member 37 and thus will rotate with it when the latter is driven by cooperating gears 33 and 36.

Disc member 81 is positioned within chamber 14 beneath a drum or wheel member 91 and engages the exterior surface thereof to serve as a drive member for effecting rotative movement of drum 91. Drum 91 comprises an annular portion 92, whose exterior surface is in contact with disc 81, and an interior flange 93. Drum 91 is supported for rotative movement by a shaft 94, shaft 94 being provided with an annular flange 95 at one end to which interior flange 93 of drum 91 is secured by mounting bolts 96. Shaft 94 is journaled adjacent one end at shaft portion 97 within bearings 98 which are located within the opening 61 in main support member 57 and has its opposite end 99, which is of smaller diameter than shaft portion 97 journaled within bearings 101 carried within a recess 102.

Suitably affixed to shaft 94 on an intermediate portion 103 thereof is a pinion gear 104 which engages with and drives an output gear 105. Output gear 105 is fitted upon portion 106 of an output shaft 107, being secured against movement relative to shaft 107 by mounting screws 108 which are threaded into an annular flange 109 provided by shaft 107. Shaft 107 is rotatively supported between bearings 111 fitted within opening 62 in main support member 57 and bearings 112 located in a recess 113 in cover 15, bearings 111 accommodating shaft portion 106 and bearings 112 accommodating an intermediate shaft portion 114. A seal assembly 115 is positioned rearwardly of bearings 112 in a recess 116 of cover 15 and in encircling relationship to shaft portion 117. As shown output shaft 107 projects a portion 118 exteriorly of cover 15 whereby advantage may be taken of rotative movement of output shaft 107.

It is noted that in the position of the parts as illustrated in Figure 3 that the axis of rotation of disc member 81 is transverse or normal to the axis of rotation of drum 91. With these axes in this transverse relationship the present transmission device is in its zero position wherein no motion is transmitted from disc member 81 to drum 91. Further discussion of this zero position will be later provided, but at this point a description will be presented respecting tilting movement of disc member 81 whereby the angular relationship of its axis of rotation to the axis of rotation of drum 91 is effected, both axes intersecting at all times throughout the range of tilting movement of disc member 81.

As hereinabove described, disc member 81 is rotatively supported upon disc support bracket 45 which in turn is pivotally mounted by pins 66 to the main support member 57. The structure for and the manner in which pivotal movement of disc support bracket 45 is obtained will now be described. Referring to Figures 3 and 6 it is noted that positioned immediately below and in interfitting engagement with the lower end of cylindrical body portion 49 of bracket 45 is an annular ring-like member 121. Annular member 121 is peripherally grooved as at 122 to provide a portion 123 which projects into recess 44 of cylindrical body portion 49, and has a central opening 124 to accommodate lock nut 86 of disc member 81. Upon the lower surface of annular member 121 on opposite sides of opening 124 are formed knife edge portions 125. Cooperating with the annular member 121 are the generally U-shaped knife-edge plate element 126 and the floating block-like member 127. Knife-edge plate element 126 is pivotally supported at its leg portions 128 by pivot pins 129 to U-shape support element 69 carried at the lower end of main support member 57. Each of the leg portions 128 of plate element 126 has a transverse knife edge 131 formed on its upper surface spaced somewhat rearwardly of the transverse axis of plate element 126. Mounted in the outer end of the bight portion 132 within suitable tapped holes provided therein are screws 133, each of which serves to secure one end of a loading spring 134. The upper ends of these loading springs 134 are suitably attached by screws 135 to the forward end surfaces of the outwardly projecting arm portions 63 and 64 of main support member 57. These arm portions 63 and 64, as above stated, also serve as the points of pivotal attachment of disc support bracket 45 which rotatively carries disc member 81. Floating block-like member 127 is of rectangular elongated shape and has formed in each of its opposite lateral edges a generally V-shaped longitudinally extending groove 136. In assembly block-like member 127 is disposed between annular ring-like member 121 and U-shaped knife-edge plate element 126, the V-shape grooves 136 affording seats within which knife edge portions 125 of ring-like member 121 and knife edges 131 of plate element 126 fit. Block-like member 127 is maintained in assembly and in engagement with the named knife-edges 125 and knife edges 131 by a holding force afforded by the tensioned loading springs 134. It is noted that the upwardly acting force which is exerted by springs 134 upon the outer end of plate element 126 is transmitted through block-like member 127 to annular ring-like member 121 and therethrough to pivotal bracket 45 and disc element 81, which bracket 45 carries. Thus springs 134 exert a force which pushes upper spherically curved face 83 of disc element 81 into contact with the outer annular face of drum 91. To vary the point of contact of the face of disc member 81 with the smooth peripheral face of drum 91, whereby the rotative movement of the latter may be changed, a control assembly, indicated generally by the numeral 140, is provided upon housing 11. Control assembly 140 operates directly to effect pivotal movement of disc support 45, which movement, it is apparent, will result in tilting of disc support member 37, of spur pinion gear 36 and of disc member 81 changing the latter's point of contact with drum 91.

As illustrated best in Figure 4, control assembly 140 comprises a control shaft 141 journaled for rotative movement within a pair of spaced usual bearings 142 and 143 carried within a housing 144. Housing 144 embodies a cylindrical body portion 145, adapted to project within housing 11 through a suitable opening in the wall of the housing, and having a mounting flange 146 which is fastened to the housing by screws 147. Suitably secured to the interior end of control shaft 141 for common movement therewith is an eccentric plate 148 which is of generally semi-circular configuration. Eccentric plate 148 mounts an eccentric pin 151 which is secured, as by a drive fit, within an appropriate opening provided in the plate 148 close to the periphery thereof. The projecting portion of eccentric pin 151 extends within guide slot 56 provided in vertical leg 55 of pivotally movable disc support bracket 45 and mounts a usual ball bearing 152 which rides on the defining wall surfaces of guide slot 56. Control shaft 141 has a portion thereof disposed exteriorly of housing 11 to which a suitable force may be applied to effect rotative movement of the shaft. It is apparent that upon rotative movement of control shaft 141 a corresponding rotative movement is afforded the eccentric plate 148 carried at the interior end of the shaft. Movement of plate 148 will cause the bearing 152 on pin 151 to ride upon the walls of guide slot 56 thereby applying a force upon vertical leg 55 which will swing disc support bracket 45 upon its associated pivot pins 66. The direction of pivotal or swinging movement of disc support bracket 45, it is apparent, is determined by the direction of rotation afforded to the control shaft 141. Disc member 81 carried upon disc support bracket 45 obviously assumes the same movement as is attained by the bracket and this results in a shifting of the point of contact of its face with the face of drum 91, the direction of shift of the point of contact being in accordance with the direction of pivotal movement of bracket 45 and disc member 81. It is apparent that shifting of the point of engagement of disc face 83 with drum 91 is an act necessary both to obtain changes in the direction of rotation of drum 91 and to secure changes in speed of drum rotation, the particular direction of rotation obtained being dependent upon which side of the center line of the drum that contact occurs and the speed of rotation being dependent upon the distance that the point of contact is spaced from such center-line.

It is further apparent that when the disc member 81 occupies a contacting position relative to drum 91 as shown in Figure 3, in which position the vertical or transverse center-line of drum 91 is aligned or co-extensive with the longitudinal center-line of disc member 81, that no motion is transmitted from the latter member to the drum. In this last mentioned position of contact disc member 81 lies in its zero or neutral position. To move the point of contact out of this zero position, it is necessary to rotate control shaft 141 to effect pivotal movement of disc support bracket 45 and a tilting of disc member 81 carried thereon. As soon as disc member 81 is tilted and the point of engagement of its face 83 with drum 91 moves to one side or the other of the vertical center-line of the drum, the drum will be forced into rotative movement. It has been found that the speed of rotation achieved by drum 91 is essentially proportional to the angle of tilt afforded disc member 81. The further that the point of engagement is moved from the vertical center-line the faster the rotative motion assumed by the drum. Even though its speed may be made to vary drum 91 will continue to rotate in the same direction so long as the points of engagement with disc face 83 are on the same side of the vertical center-line, rotation in the opposite direction is not obtained until disc member 81 is induced, by the operation of control shaft 141, to tilt in the opposite direction to shift its point of contact to the opposite side of the drum.

It is noted that throughout the tilting or rocking movements experienced by disc members 81 that an even and firm engagement between its face 83 and drum 91 is always maintained, this permanency of contact being obtained through the agency of the springs 134. It is apparent that with the present assembly as disc member 81 is made to tilt or rock relative to drum 91 that no change will occur in the springs 134 and the force applied by such springs remains constant to result in a uniform application of pressure by disc member 81 to drum 91 in all positions of engagement. It is apparent, therefore, that since no work is performed on the springs it becomes necessary in effecting changes in the point of contact only to overcome rolling friction. Variations in speed and reversals of direction of rotation are achieved in the present invention smoothly and rapidly and without waste effort. In obtaining this desirable manner of operation the elements which transmit the force of springs 134 to drum 91 are so arranged as to afford a system which is always in equilibrium. It is noted that the knife edge 131 of plate 126, knife edge 125 of ring-like member 121, and block 127 are so arranged relative to the longitudinal axis of disc member 81 that the line of action of the force applied by springs 134 always passes through the two knife edges 125 and 131 and passes essentially through the point of contact of disc face 83 with drum 91. Effecting changes in tilt positions of disc member 81 will, in the present invention, necessitate only the application of very small forces upon the control shaft 141. It is noted that a force vector representing the spreading forces which develop between the gears 33 and 36 when subject to loads transversely intersects the pivotal axis (the line between pivots 66) of the disc system. Locating the gears so that such intersection is the case effectively serves to prevent the creation of a turning moment on the disc system and assists in obtaining a system which is in equilibrium.

The present invention affords an efficient and effective device for obtaining an adjustable or variable-shaft speed from a constant speed source. It is particularly characterized by the simplicity and ease with which speed variations and reversal of motion are achieved.

Although it is preferred that the motor which actuates drive shaft 25 be a constant speed, continuously running motor, it is understood, of course, that the invention is not limited to use with only this type of motor. A continuously running motor is preferred because of convenience and for use in applications having sudden output demands wherein it is necessary to have power available which can be instantly taken advantage of. As has been stated, when disc member 81 occupies its neutral position relative to drum 91 there is no rotation of the drum 91 and obviously no rotation of the output shaft 107. However, when it is necessary to use the output shaft 107 to provide a force for a desired task such force is readily and instantly available, since all that is required to fulfill the demand is an actuation of control shaft 141 in the desired direction. As has been explained, the actuation of control shaft 141 immediately effects tilting movement of disc support bracket 45 and disc member 81, which movement results in moving the point of contact of disc face 83 with drum 91. Upon movement of the point of contact output shaft 107 is immediately put into motion since the power of drive shaft 25, which power is always available, in the preferred use of this invention, by reason of the employment of a continuously running motor, is instantly taken advantage of to rotate drum 91 and thereby rotate output shaft 107 through the gearing interconnecting these elements. This transmission of power from input shaft 25 to output shaft 107 is accomplished effortlessly and without interruption. The present arrangement offers a stepless range of output-shaft speeds in both directions, or, if desired, a stand-still (zero speed) condition may be obtained. Further, in changing from high speed to zero speed, or vice versa, with the motor running, in the present device, no resort must be had to complex structure and interconnections. Also, by reason of the low inertia of the drum of the present invention very quick reversals in direction and changes in speed are permitted. It is further apparent that in the present construction with the power transmitting elements adapted to be placed in zero position that there is no need of a brake or other holding device when the need for output power ceases.

Control shaft 141 which governs the transmission of power from drive shaft 25 to output shaft 107, obviously, may be controlled manually, or by automatic means, or remotely, or in any desired manner. For example, a push-pull cable or a flexible drive shaft could be employed to actuate shaft 141; or a diaphragm or a bellows could be suitably coupled to control shaft 141 so as to rotate it in respond to pneumatic or hydraulic pressure changes. By use of two diaphragms or bellows the unit, it is evident, may be made to respond to differential changes in pressure. Also, electrical control could be employed such as through the use of one or more solenoids coupled to the control shaft and arranged so that each solenoid actuates the control shaft to a desired degree so as to produce a particular output-shaft speed when energized. In this manner, a variety of speeds could be obtained by push-button control. In addition, differential or proportional solenoids could be coupled to the control shaft and operated from a vacuum tube amplifier to provide output-shaft speeds proportional to the differential current in the solenoids. Thus, it is apparent that any number of control methods and devices may be employed to effect actuation of control shaft 141.

If desired, when the present invention is to be manually controlled, a suitable dial may be located on the control shaft 141 to permit the ready procurement of a desired speed and in the desired direction.

The present device is particularly desirable for use in driving machines or devices requiring an adjustable or variable driven speed or a given speed not readily obtainable from a constant speed source or from a fixed ratio transmission system. It is useful in applications where the driven speed must be varied with or according to the function of operation of a machine. It is particularly effective for such applications where the power or force representing the function which must actuate the control shaft 141 is quite small.

While certain preferred embodiments of the invention have been specifically disclosed it is understood that the invention is not limited thereto as many variations will be readily apparent to those skilled in the art and the invention is to be given its broadest possible interpretation within the terms of the following claims.

What we claim is:

1. In a transmission, a drum mounted for rotation about a fixed axis, an output shaft operatively connected to said drum to be driven thereby, a rotatable disc member engageable with said drum, support means rotatably mounting said disc member and adapted to position said disc member in a neutral position wherein its axis of rotation is normal to the drum axis of rotation, means for pivotally mounting said support means whereby said support means may move to carry said disc member to and at opposite sides of said neutral position to vary the direction and speed of rotation of said drum, means for exerting a force upon said support means to hold said disc member and drum in engagement, said force exerting means comprising a pivotally mounted knife-edge member, a second knife-edge member carried upon said support means, and spaced from the first knife-edge member, a member mounted between the knife-edges of said spaced knife-edge members and spring means arranged to apply its resilient force to one of said knife-edge members to be transmitted to said support means, and means for tilting said support means to change the point of engagement between said drum and said disc member.

2. In a transmission, a drum mounted for rotation about a fixed axis, an output shaft operatively connected to said drum to be driven thereby, a rotatable disc member engageable with said drum, support means rotatably mounting said disc member and adapted to position said disc member in a neutral position wherein its axis of rotation is normal to the drum axis of rotation, means for pivotally mounting said support means whereby said support means may move to carry said disc member to and at opposite sides of said neutral position to vary the direction and speed of rotation of said drum, means for exerting a force upon said support means to hold said disc member and drum in engagement, said force exerting means comprising a pivotally mounted knife-edge member, a second knife-edge member carried upon said support means and spaced from the first knife-edge member, a member carried by and between the knife-edges of said spaced knife-edge members and spring means arranged to apply its resilient force to one of said knife-edge members to be transmitted to said support means, and control means for tilting said support means to change the point of engagement between said drum and said disc member, said control means comprising a rotatable shaft and means interconnecting said shaft and said support means.

3. In a transmission, a drum mounted for rotation about a fixed axis, an output shaft operatively connected to said drum to be driven thereby, a disc member for driving said drum, said disc member having a face portion of spherical curvature engageable with said drum, a support member rotatably mounting said disc member and adapted to position said disc member in a neutral position wherein its axis of rotation is normal to the drum axis of rotation, means for pivotally mounting said support member whereby said support member may move to carry said disc member to and at opposite sides of said neutral position to vary the direction and speed of rotation of said drum, means for rotating said disc member, means for exerting a force upon said support member to hold said face portion of said disc member and drum in engagement, said force exerting means comprising a pivotally mounted knife-edge member, a second knife-edge member carried upon said support means and spaced from the first knife-edge member, a member carried by and between the knife-edges of said spaced knife-edge members and spring means arranged to apply its resilient force to said pivotally mounted knife-edge member to be transmitted therefrom to said support member, and means for tilting said support member to change the point of engagement between said drum and said face portion of said disc member.

4. In a transmission, a drum mounted for rotation about a fixed axis, an output shaft operatively connected to said drum to be driven thereby, a disc member for driving said drum, said disc member having a face portion of spherical curvature engageable with said drum, support means rotatably mounting said disc member and adapted to position said disc member in a neutral position wherein its axis of rotation is normal to the drum axis of rotation, means for pivotally mounting said support means whereby said support means may move to carry said disc member to and at opposite sides of said neutral position to vary the direction and speed of rotation of said drum, means for rotating said disc member, means for exerting a force upon said support means to hold said face portion of said disc member and drum in engagement, said force exerting means comprising a pivotally mounted knife-edge plate member, a second knife-edge member carried upon said support means and spaced from said first knife-edge member, a member carried by and between the knife-edges of said spaced knife-edge members and spring means arranged to apply its resilient force to said knife-edge plate member to be transmitted therefrom to said support means, and means for tilting said support means to change the point of engagement between said drum and said disc member, said control means comprising a rotatable shaft and means interconnecting said shaft and said support means.

5. In a variable speed driving mechanism, a motor driven shaft, an output shaft, a rotatably mounted drum having an operative connection with said output shaft for effecting rotation thereof, a disc member engageable with said drum for effecting rotation thereof, a support member rotatably mounting said disc member and adapted to position said disc member in a neutral position wherein its axis of rotation is normal to the axis of rotation of said drum, means pivotally mounting said support member whereby said support member may move to carry said disc member to and at opposite sides of said neutral position to vary the direction and speed of rotation of said drum, means interconnecting said motor driven shaft and said disc member for effecting rotation of the latter, means for exerting a force upon said support member to hold said disc member and drum in engagement, said force exerting means comprising a pivotally mounted knife-edge member, a second knife-edge member having a support upon said support member and spaced from the first knife-edge member, a member carried by and between the knife-edges of said spaced knife-edge members and spring means operatively connected to said pivotally mounted knife-edge member to apply its resilient force thereto to be transmitted to said support member, and control means for tilting said support member to change the point of engagement between said drum and said disc member, said control means comprising a rotatable shaft and an eccentric connection between said shaft and said support member.

6. In a variable speed driving mechanism, a motor driven shaft, an output shaft, a rotatably mounted drum having an operative connection with said output shaft for effecting rotation thereof, a disc member for driving said drum, said disc member having a face portion of spherical curvature engageable with said drum for effecting rotation thereof, a support member rotatably mounting said disc member and adapted to position said disc member in a neutral position wherein its axis of rotation is normal to the axis of rotation of said drum, means pivotally mounting said support member whereby said support member may move to carry said disc member to and at opposite sides of said neutral position to vary the direction and speed of rotation of said drum, means interconnecting said motor driven shaft and said disc member for effecting rotation of the latter, means for exerting a force upon said support member to hold said face portion of said disc member and drum in engagement, said force exerting means comprising a pivotally mounted knife-edge member, a second knife-edge member having a support upon said support member and spaced from the first knife-edge member, a member carried by and between the knife-edges of said spaced knife-edge members and spring means operatively connected to said pivotally mounted knife-edge member to apply its resilient force thereto to be transmitted to said support member, and control means for tilting said support member to change the point of engagement between said drum and said disc member, said control means comprising a rotatable shaft and an eccentric connection between said shaft and said support member.

References Cited in the file of this patent

UNITED STATES PATENTS

| 1,501,163 | Curtis | July 15, 1924 |
| 2,693,709 | Newell | Nov. 9, 1954 |

FOREIGN PATENTS

| 129,093 | Germany | Apr. 1, 1902 |
| 477,092 | Great Britain | Dec. 22, 1937 |